(12) United States Patent
Kieras et al.

(10) Patent No.: US 10,908,008 B2
(45) Date of Patent: Feb. 2, 2021

(54) HAND HELD DOSER

(71) Applicant: LB USA FLEXIBLES, INC., Bolingbrook, IL (US)

(72) Inventors: Ronald E. Kieras, Bolingbrook, IL (US); Matthew Ruschmeier, Glencoe, MN (US)

(73) Assignee: LB USA Flexibles, Inc., Bolingbrook, IL (US)

( * ) Notice: Subject to any disclaimer, the term of this patent is extended or adjusted under 35 U.S.C. 154(b) by 0 days.

(21) Appl. No.: 15/861,151

(22) Filed: Jan. 3, 2018

(65) Prior Publication Data

US 2018/0188092 A1 Jul. 5, 2018

Related U.S. Application Data

(60) Provisional application No. 62/442,146, filed on Jan. 4, 2017.

(51) Int. Cl.
*G01F 11/32* (2006.01)
*B65D 47/24* (2006.01)
*G01F 15/14* (2006.01)

(52) U.S. Cl.
CPC ............ *G01F 11/32* (2013.01); *B65D 47/248* (2013.01); *G01F 15/14* (2013.01)

(58) Field of Classification Search
CPC ....... G01F 11/32; G01F 15/14; B65D 47/248; B65D 47/244; B65D 47/245
USPC ..... 222/402.1, 510–514, 440–442, 455–457, 222/448, 449, 453, 509, 518
See application file for complete search history.

(56) References Cited

U.S. PATENT DOCUMENTS

| | | | | |
|---|---|---|---|---|
| 2,059,608 A | * | 11/1936 | Rochester | B65D 5/76 222/361 |
| 2,543,850 A | * | 3/1951 | Henricson | B65D 47/248 222/213 |
| 2,685,978 A | * | 8/1954 | Crockett | B67D 1/0456 215/283 |
| 3,141,585 A | * | 7/1964 | Emmert | B01J 4/02 222/288 |
| 3,666,150 A | * | 5/1972 | Liljeholm | G01F 11/34 222/453 |
| 4,452,425 A | * | 6/1984 | Lucking | F16K 21/04 220/724 |
| 4,687,123 A | * | 8/1987 | Hyde | F16K 21/04 222/518 |
| 5,447,257 A | * | 9/1995 | Dark | B65D 83/48 137/903 |

(Continued)

*Primary Examiner* — Lien M Ngo
(74) *Attorney, Agent, or Firm* — McAndrews, Held & Malloy, Ltd.

(57) ABSTRACT

The invention provides a hand held dispenser which has an upper enclosure for holding material to be dispensed, the upper enclosure having an open end. The invention has a lower dispenser which is connected to the upper enclosure and which has a dispensing opening which is selectively sealed by a valve. The valve has a seal end and a valve stem end, the valve stem end operatively engaged to an elastic button. When the button is depressed, the valve seal end is pushed out of the dispensing opening, to allow material to be dispensed from the hand held dispenser and when the button is released, it elastically returns to an undepressed position, closing the dispensing opening.

10 Claims, 16 Drawing Sheets

(56) References Cited

U.S. PATENT DOCUMENTS

| | | | | |
|---|---|---|---|---|
| 6,269,962 B1 * | 8/2001 | Anderson | ............ | B65D 1/0261 |
| | | | | 215/383 |
| 6,401,752 B1 * | 6/2002 | Blackbourn | ........... | B67D 3/044 |
| | | | | 137/588 |
| 6,631,744 B1 * | 10/2003 | Gerhart | .................... | B65D 1/18 |
| | | | | 141/22 |
| D556,584 S * | 12/2007 | Dorn | ............................... | D9/527 |
| 7,708,164 B2 * | 5/2010 | Pritchard | .............. | A47K 5/1208 |
| | | | | 222/207 |
| 8,464,917 B2 * | 6/2013 | Nini | .................... | B67D 3/0045 |
| | | | | 222/481.5 |
| 9,448,095 B2 * | 9/2016 | Maher | .................... | B65D 11/22 |
| 2003/0230545 A1 * | 12/2003 | Mount | ................... | B65D 1/023 |
| | | | | 215/42 |
| 2008/0237276 A1 * | 10/2008 | Lester | .................... | B67D 3/043 |
| | | | | 222/518 |
| 2013/0008915 A1 * | 1/2013 | Dorn | ....................... | A45F 5/102 |
| | | | | 220/755 |

* cited by examiner

HAND HELD DOSER

CROSS-REFERENCE TO RELATED APPLICATIONS

This application claims priority to provisional application No. 62/442,146, filed Jan. 4, 2017, the entire contents of which is hereby incorporated by reference.

STATEMENT REGARDING FEDERALLY SPONSORED RESEARCH

Not Applicable

FIELD OF THE INVENTION

The invention relates to a dispenser and/or doser which is hand-held and can dispense a variety of products.

BACKGROUND OF THE INVENTION

What is needed is a dispenser which can be hand-held and which can dispense a variety of products.

BRIEF SUMMARY OF THE INVENTION

The invention provides a hand held dispenser which has an upper enclosure for holding material to be dispensed, the upper enclosure having an open end. The invention has a lower dispenser which is connected to the upper enclosure and which has a dispensing opening which is selectively sealed by a valve. The valve has a seal end and a valve stem end, the valve stem end operatively engaged to an elastic button. When the button is depressed, the valve seal end is pushed out of the dispensing opening, to allow material to be dispensed from the hand held dispenser and when the button is released, it elastically returns to an undepressed position, closing the dispensing opening.

An alternate embodiment of the hand held doser also includes an upper enclosure for holding material to be dispensed, the upper enclosure having an open end and an elastic dosing button end. The doser has a first valve which has a seal end sealing the open end of the upper enclosure, and a valve stem which is operatively engaged to the button end of the upper enclosure. The doser has a lower dispenser which is connected to the upper enclosure and which has a dispensing opening which is selectively sealed by a second valve. The second valve of the doser has a seal end and a valve stem end, the valve stem end operatively engaged to a dispensing elastic button. When the dosing button is depressed, the valve seal end allows a dose of material to flow into the lower dispenser, and when the dosing button is released, it elastically returns to an undepressed position, closing the upper enclosure. Finally, the material is dispensed by actuating the dispensing elastic button, to allow material to be dispensed from the hand held doser and when the dispensing elastic button is released, it elastically returns to an undepressed position, closing the dispensing opening.

DETAILED DESCRIPTION OF THE INVENTION

Figure 1:
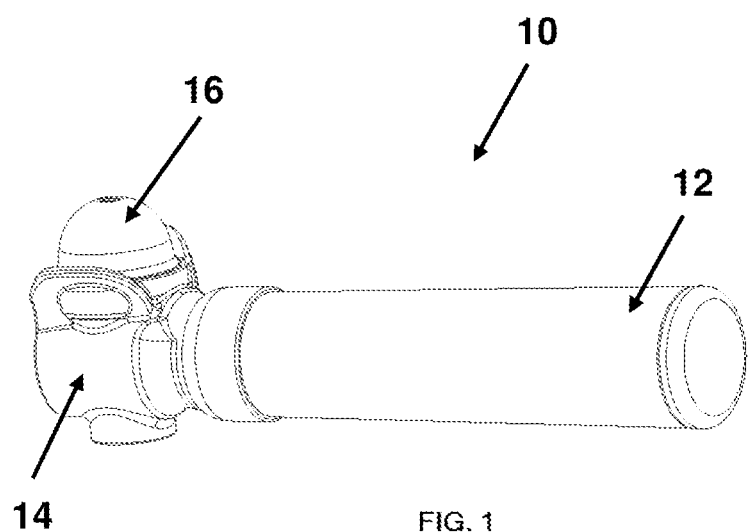
FIG. 1 is a view showing a first embodiment of a dispenser.

While this invention may be embodied in many forms, there are described in detail herein specific embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

Figure 2:
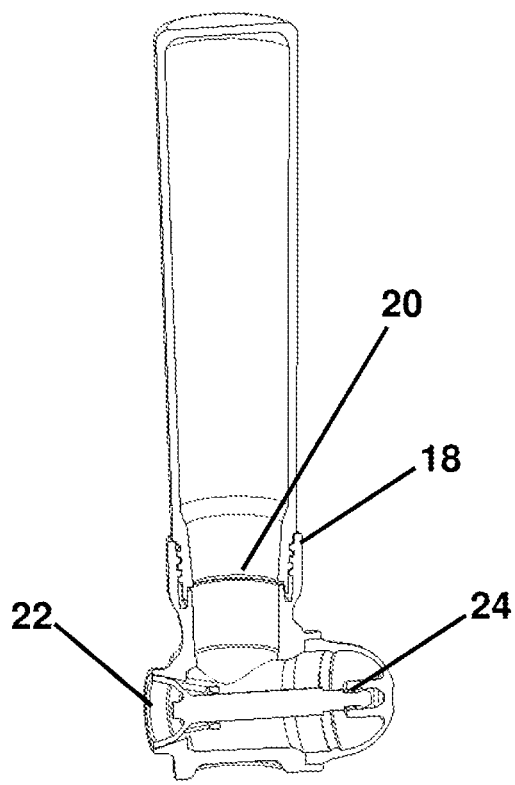
FIG. 2 is a cross section view of FIG. 1 showing the valve in the closed position.
Figure 3:
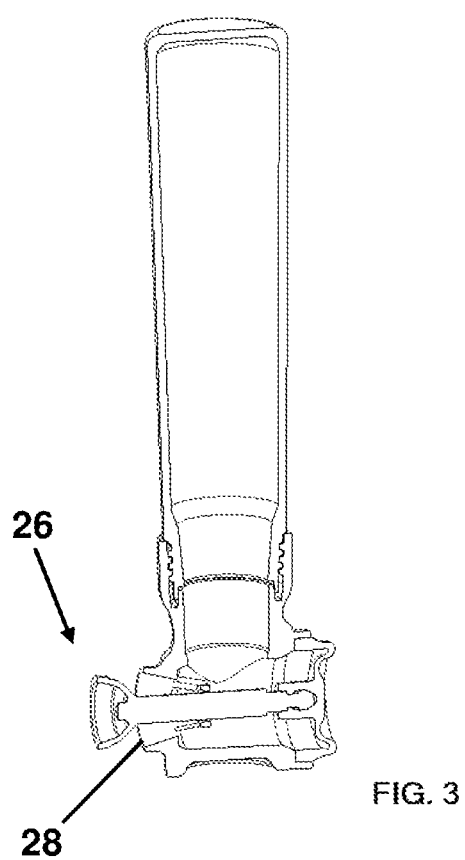
FIG. 3 is a cross section view of FIG. 1 showing the valve in the open position.
Figure 4:
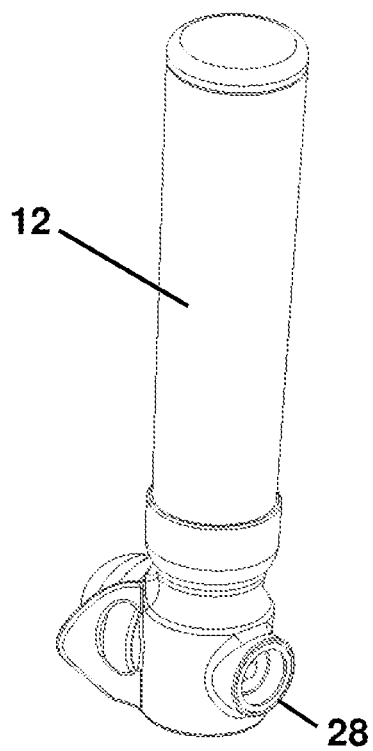
FIG. 4 shows the first embodiment in the upright dispensing position.
Figure 5:
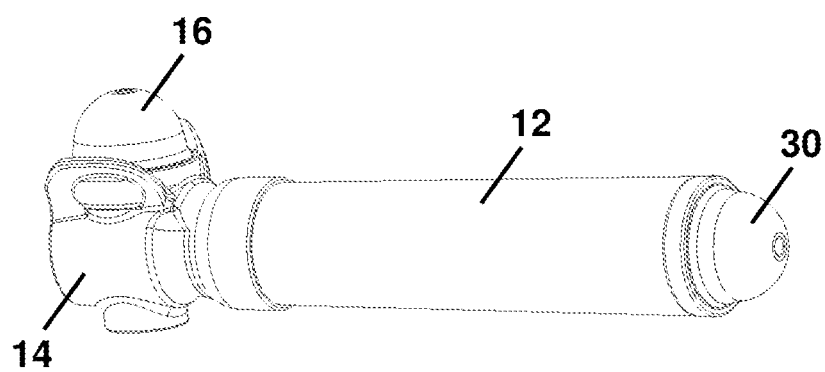
FIG. 5 is a view showing a second embodiment of a doser dispenser.
Figure 6:
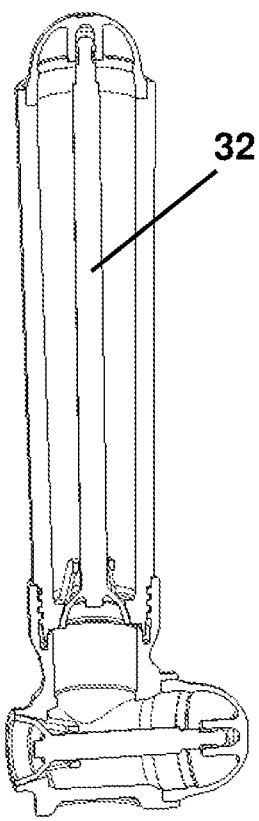
FIG. 6 is a cross section view of FIG. 5 showing both valves in the closed position.
Figure 7:
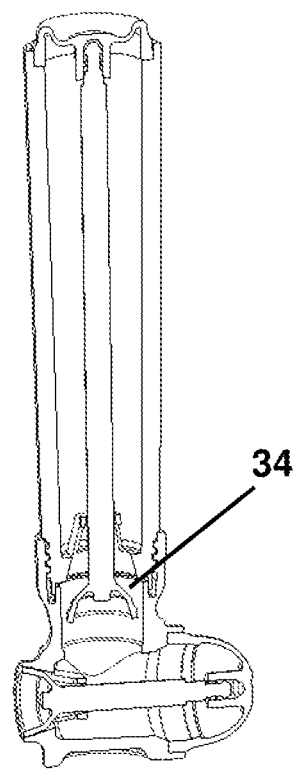
FIG. 7 is a cross section view of FIG. 5 showing the doser valve in the open position.
Figure 8:
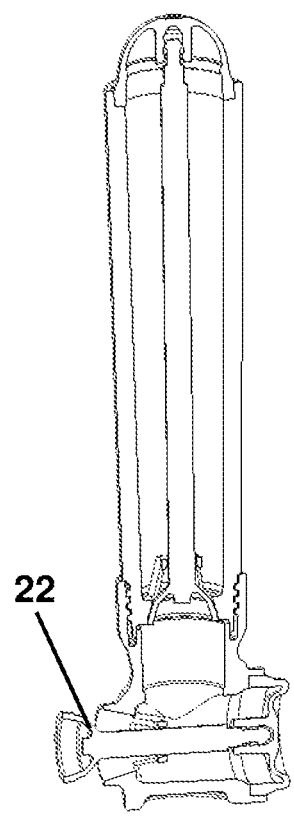
FIG. 8 is a cross section view of FIG. 5 showing the doser valve in the closed position and the dispensing valve in the open position.
Figure 9:
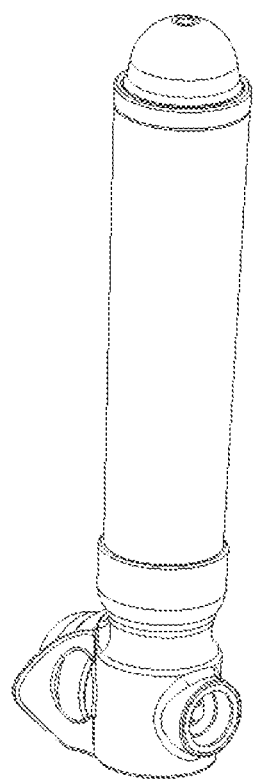
FIG. 9 shows the second embodiment in the upright doser dispensing position.

Referring now to FIGS. 1-4, a first embodiment of the inventive dispenser is shown generally at 10. The upper receptacle is shown at 12, which holds the material to be dispensed. The lower dispensing end is shown at 14 and the elastic dispensing button is shown at 16. The upper end 12 and the lower end 14 can be threadably connected, as shown in FIG. 2 at 18 or snap fit together. The material is dispensed by flowing through the open end 20, into the dispensing end 14. The valve is normally closed, shown at 22. When elastic button 16 is depressed, the valve stem 24 is pushed and the valve seal end 22 is moved to the open position, shown generally at 26 in FIG. 3. The material is now free to flow out the dispenser opening 28. When elastic button 16 is released, it returns to its undepressed position, pulling the valve to the closed position of FIG. 2. It can be seen from FIGS. 1-4 that the dispensing opening 28 is perpendicular to the open end 20 of the upper enclosure 12. The valve, including the valve stem 24 and the valve seal end 22 are also arranged perpendicular to the open end 20 of the upper enclosure 12.

An alternative embodiment of a doser dispenser is shown in FIGS. 5-9, in which the upper receptacle is shown at 12. In this embodiment, a dose of material is allowed to flow to the lower dispensing chamber 14 by pressing the dosing button 30, which is operatively connected to the dosing valve 32 to open the end of 12 and allow material to flow into 14, which is sized to the appropriate dose (depending on what is being dispensed). When the elastic button 30 is released, it returns to the undepressed position, closing opening 34 to the position of FIG. 6. The side button 16 is then actuated to open valve 22 to dispense the dosed material.

Figure 10:
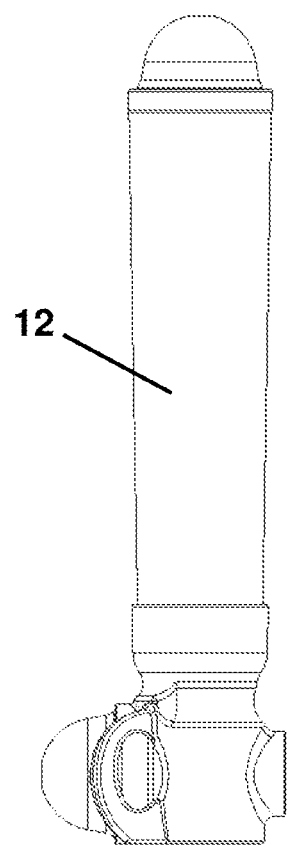
FIG. 10 shows another embodiment with a transparent upper receptacle.
Figure 11:
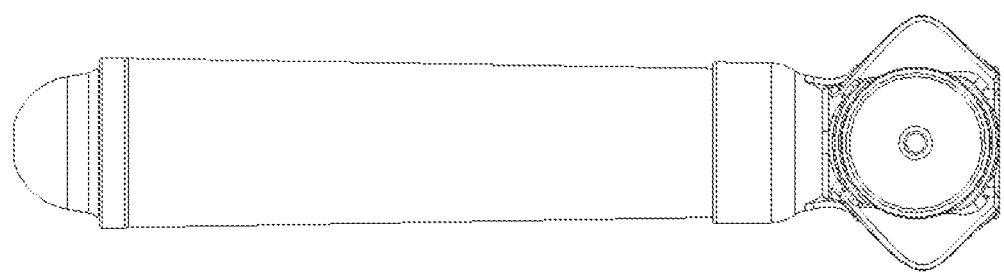
FIG. 11 shows the embodiment of FIG. 10 from another angle.
Figure 12:
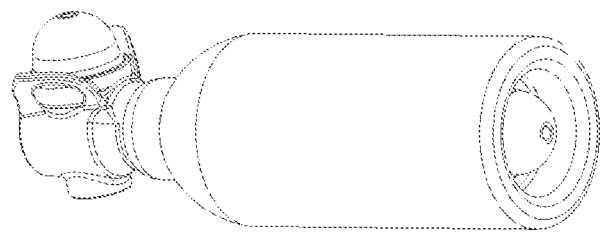
FIG. 12 is a view showing a third embodiment of a doser dispenser.
Figure 13:
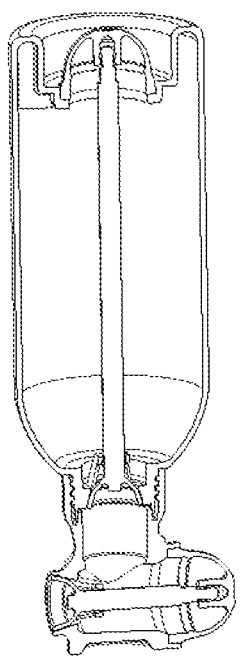
FIG. 13 is a cross section view of FIG. 12 showing both valves in the closed position.
Figure 14:
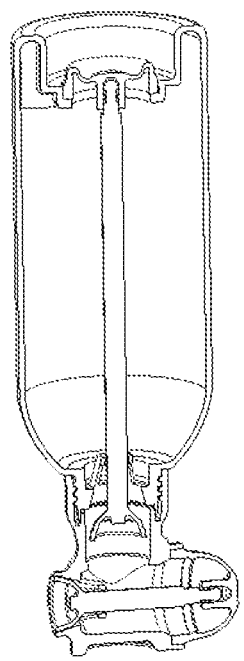
FIG. 14 is a cross section view of FIG. 12 showing the doser valve in the open position.
Figure 15:
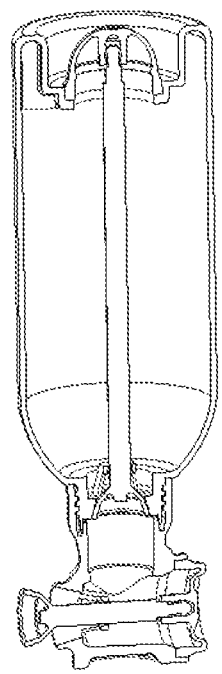
FIG. 15 is a cross section view of FIG. 12 showing the doser valve in the closed position and the dispensing valve in the open position.
Figure 16:
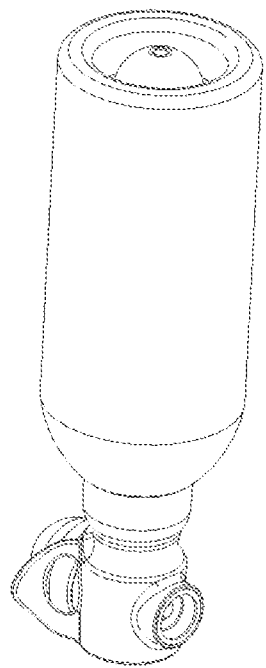
FIG. 16 shows the third embodiment in the upright doser dispensing position.

FIGS. 10 and 11 show another embodiment with a transparent upper receptacle 12.

FIG. 12-16 show another embodiment with a larger upper receptacle 12. The upper receptacle can be made any desired size.

All of the parts of the invention are made out of various types of plastics. For example, the upper enclosure and lower dispenser portion, as well as the valve can be made from polypropylene (PP), high density polyethylene (HDPE), low density polyethylene (LDPE), thermoplastic elastomer (TPE), thermoplastic polyurethane (TPU), rubber, silicone or urethane. The elastic button(s) can be made from thermoplastic elastomer (TPE) or thermoplastic polyurethane (TPU). The receptacle is attached to the dispenser portion using threads, press fit, etc. The valve is actuated from the side, and the dispenser can be tipped to allow the material to flow out the opening. The embodiments described herein provide for controlled and variable flow, with a dosing option. The dispenser can dispense Topical products, chemicals, treatments, stains, paints, spot removers, medications and other liquid materials. Optional fitments such as a unit doser (shown in the figures), a bruch applicator, a ball applicator or a dauber applicator, all of which are well known in the art. These fitments can be attached to the opening, if desired.

What is claimed is:

1. A hand held doser comprising:
    an upper enclosure for holding material to be dispensed, the upper enclosure having an open end and an elastic dosing button end;
    a first valve which has a seal end sealing the open end of the upper enclosure, and a valve stem which is operatively engaged to the button end of the upper enclosure;
    a lower dispenser which is connected to the upper enclosure and which has a dispensing opening which is selectively sealed by a second valve;
    the second valve having a seal end and a valve stem end, the valve stem end operatively engaged to a dispensing elastic button,
    whereby when the dosing button is depressed, the valve seal end allows a dose of material to flow into the lower dispenser, and when the dosing button is released, it elastically returns to an undepressed position, closing the upper enclosure, and
    further whereby the material is dispensed by actuating the dispensing elastic button, to allow material to be dispensed from the hand held doser and when the dispensing elastic button is released, it elastically returns to an undepressed position, closing the dispensing opening.

2. The hand held doser of claim 1 wherein the upper enclosure is cylindrical.

3. The hand held doser of claim 1 wherein the material to be dispensed is a liquid.

4. The hand held doser of claim 1 wherein the dispensing opening, the dispensing valve and the dispensing button are arranged along an axis.

5. The hand held doser of claim 1 wherein the upper enclosure and the lower dispenser are threadably connected.

6. The hand held doser of claim 1 wherein the upper enclosure and the lower dispenser are snap fit together.

7. The hand held doser of claim 1 wherein the material to be dispensed is selected from the group consisting of topical products, chemical products, treatment products such as cough syrup, medications, stain products, paint products, spot remover products and animal tick and flea products.

8. The hand held doser of claim 1 wherein the upper enclosure is made of a transparent material.

9. The hand held doser of claim 1 wherein the upper enclosure is made from a material selected from the group consisting of polypropylene (PP), high density polyethylene (HDPE), low density polyethylene (LDPE), thermoplastic elastomer (TPE), thermoplastic polyurethane (TPU), rubber, silicone and urethane.

10. The hand held doser of claim 1 wherein the elastic buttons are made from a material selected from the group consisting of thermoplastic elastomer (TPE) or thermoplastic polyurethane (TPU).

* * * * *